Sept. 29, 1970  R. BRESCIA  3,531,800
DIGITAL POSITION MEASURING DEVICE
Original Filed Oct. 6, 1965  2 Sheets-Sheet 1

INVENTORS
RICCARDO BRESCIA
ELIA BARATTO
BY *W.E.Beatty*
ATTORNEY

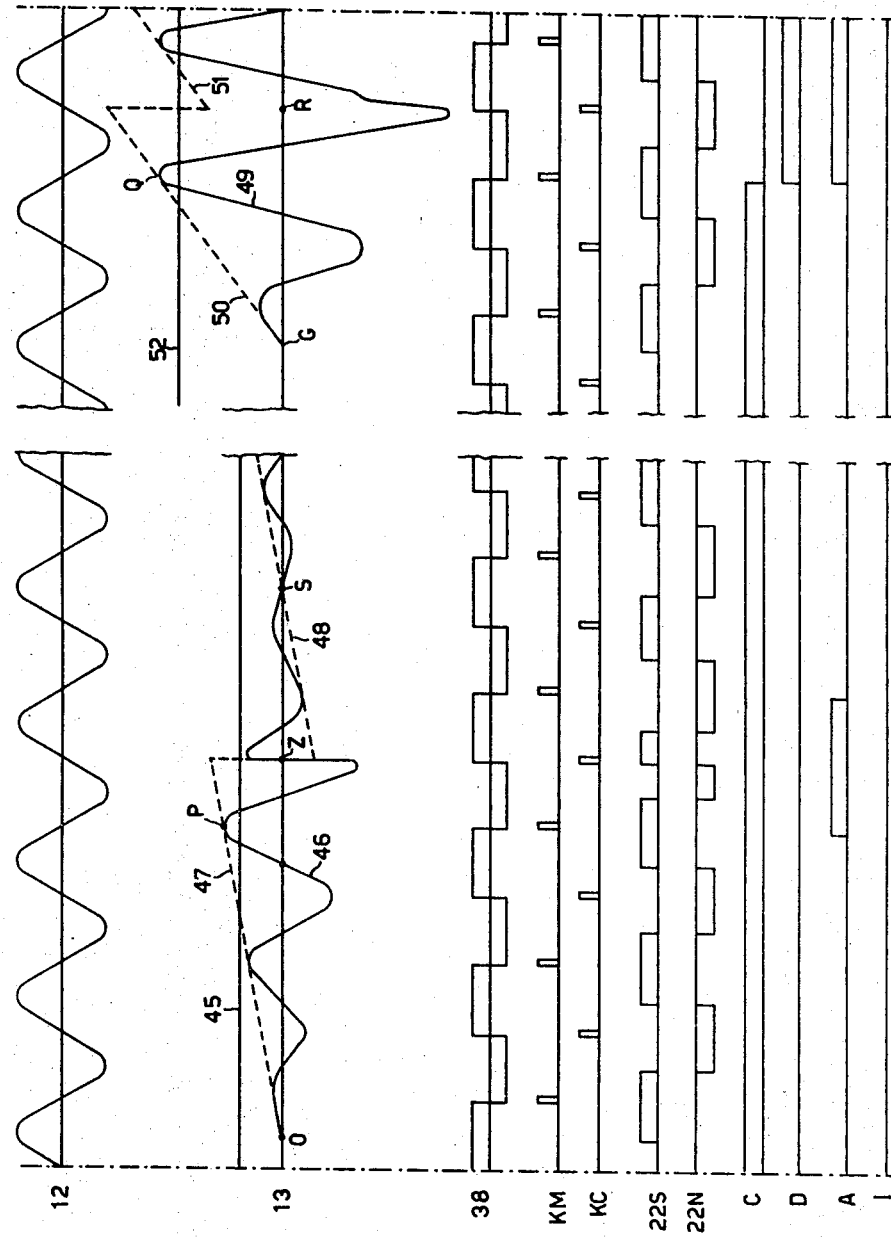

United States Patent Office 3,531,800
Patented Sept. 29, 1970

3,531,800
DIGITAL POSITION MEASURING DEVICE
Riccardo Brescia and Elia Baratto, Ivrea, Italy, assignors to Ing. C. Olivetti & C. S.p.A., Ivrea, Italy, an Italian corporation
Continuation of application Ser. No. 493,336, Oct. 6, 1965. This application Sept. 22, 1969, Ser. No. 860,116
Claims priority, application Italy, Oct. 8, 1964, 21,769/64
Int. Cl. H03k *13/17;* H02p *5/00*
U.S. Cl. 340—347                            4 Claims

ABSTRACT OF THE DISCLOSURE

A device for measuring in digital form the position of a movable element with respect to a fixed element, such as in a machine tool. A single transducer provides a voltage varying with the magnitude and sign of a displacement, which voltage is analyzed and then used to control a counter. The counter provides a digital output which is converted into analog form and supplied to the fixed element of the transducer to reduce the voltage output of the transducer to a null.

GENERAL DESCRIPTION

This is a continuation of application Ser. No. 493,336, filed Oct. 6, 1965.

The present invention refers to a digital position measuring device for measuring the displacement of a movable member with respect to a fixed member, comprising an internal counter whose digital contents, converted into an analog form, is continuously compared with an analog magnitude representing the present position of the movable member for supplying an error signal which controls the application of counting pulses to said counter.

In the position measuring devices of the above mentioned type, when said movable member is continuously displaced, the magnitude of the error signal depends upon the displacement speed, because the system exhibits an inherent inertia to follow the modifications applied thereto.

A digital measuring device of the above mentioned type is known, wherein a digital-to-analog converter fed by said counter comprises a fine section and a coarse section which feed the fine section and the coarse section, respectively, of a position transducer, said position transducer being adapted to continuously compare the present position of the movable member with the digital contents of the counter converted into analog form, in order to produce fine and coarse error signals, respectively, which via a control unit, control the counting operation of the fine and the coarse sections of the counter respectively.

Such a digital position measuring device has the disadvantage of requiring two separate servo-systems to control the fine and the coarse portion of the error signal, respectively, said two servo-systems having, as a common input, the analog magnitude representing the present position of the movable member. Therefore the equipment, which requires a digital-to-analog converter and a measuring transformer for the fine section, and another digital-to-analog converter and another measuring transformer for the coarse section, appears to be complicated and expensive.

Furthermore, in the known system two different frequencies are used to feed the fine and the coarse section, respectively, whereby the complexity of the equipment is further increased because proper frequency dividers are required in order to obtain the two different frequencies from a single oscillator.

The above mentioned disadvantages are obviated by the digital position measuring device according to the invention, which is characterized in that said internal counter is suited to selectively operate with different counting speeds depending upon the displacement speed of the movable member.

This and other features of the invention will clearly appear from the following description of a preferred embodiment thereof, made by way of example and not in a limiting sense, with reference to the annexed drawings, in which:

FIGS. 3a and 3b show a time diagram of some signals present in the converter illustrated in FIG. 1.

Figure 1:
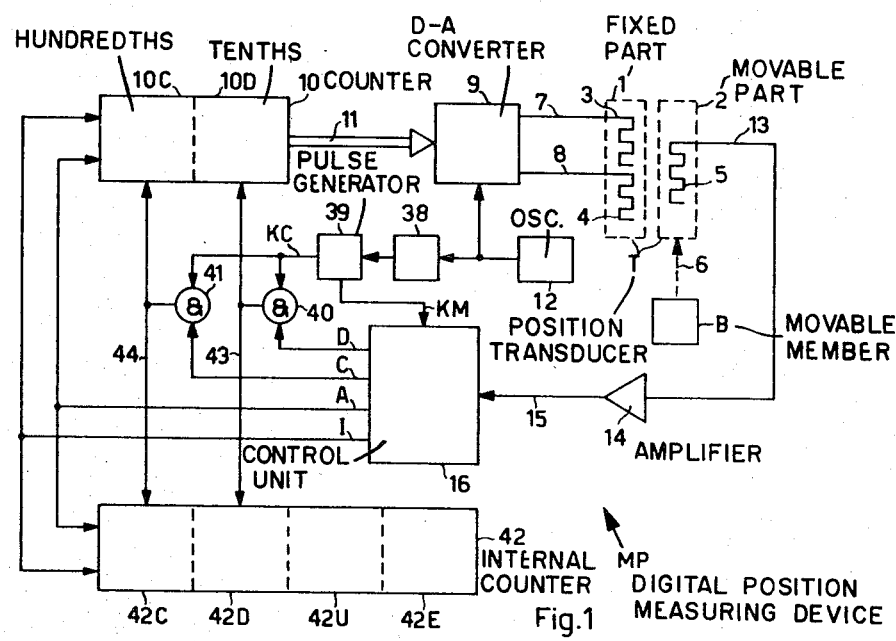
FIG. 1 shows the block diagram of the circuits of the digital position measuring device according to the invention.

According to the embodiment illustrated in FIG. 1 the digital position measuring device is designed to measure the position of a movable element with respect to a predetermined fixed reference point and to produce a digital representation of said position.

FIG. 1 and the following description refer to a special use of the digital position measuring device MP according to the invention, in a system having a member movable along only one displacement axis; however, it is clear that such an embodiment can immediately be extended to operate in a system having a member movable along two or more axes, or around two or more axes, since it is sufficient to complete the system with a separate digital position measuring device, of the type that will now be described, for each one of said axes.

The digital position measuring device MP comprises a position transducer T having a fixed part 1 connected to a fixed member, for instance to the framework of the equipment on which said transducer is used, and a movable part 2 sliding for instance along an axis X and fixed to the movable member of the same equipment. The position transducer T may be of the type as described in the U.S. Pat. No. 2,799,835, which comprises a pair of multipolar primary windings 3 and 4, phase-shifted in the space and connected to the fixed part 1, and a multipolar secondary winding 5 fixed to the movable part 2. As it is well known, in such a position transducer, the position of the movable part with respect to the fixed part can be represented by the relative displacement of the secondary winding with respect to the pair of primary windings, said displacement being represented as an angle measured in electrical degrees, bearing in mind that the polar pitch of the three windings 3, 4 and 5, which corresponds to 360 electrical degrees, is equal, for instance, to 2 mm.

The position measuring transformer T is suited to continuously compare the signals applied in analog form to its input terminals 7 and 8 and an analog magnitude applied to the independent input 6 and representing the present position of movable part 2 and, hence, the position of secondary winding 5. Said analog magnitude is supplied by the movable member B of the equipment, e.g. a carriage equipped with a reference index and movable along sliding guides in a certain direction X. If the movable element B is rigidly connected to the movable part 2 of the position measuring transformer T, said analog magnitude applied to the independent input 6 directly represents the present position of the movable member B along the displacement direction X; more generally, the movable member B may be connected to the movable part 2 through mechanical transmission means and in this case the analog magnitude applied to the input 6 is represented by the present position of the movable part 2.

The position measuring transformer T is fed, via the input terminals 7 and 8, to a digital-to-analog converter 9, which, in turn, is fed by the internal counter 10. The converter 9 is suited to transform the digital information, which is applied e.g. in binary notation and in parallel form to its input terminals via a transfer channel 11, into an analog information represented by means of the sine and cosine functions of the electrical angle represented by said digital information, bearing in mind that the maximum number which can be represented by the internal counter 10 is equal to 360 electrical degrees and also to the polar pitch of windings 3, 4 and 5 of position measuring transformer T.

More particularly, said converter 9, upon being fed by a sinusoidal oscillator 12 having for instance a 10 kHz. frequency, supplies, on output 7 feeding the fixed primary winding 3, a sinusoidal signal having a 10 kHz. frequency and a maximum amplitude proportional to the sine of said angle, and, on output 8 feeding the fixed winding 4, a sinusoidal signal having also a 10 kHz. frequency and a maximum amplitude proportional to the cosine of said angle.

The digital-to-analog converter 9 may be of any known type, such as shown in U.S. Pat. No. 2,849,668 provided that its components be chosen in such a way that the switching time required by converter 9 to set up on its output the analog representation of the digital value applied to its input terminal 11, be short enough with respect to the oscillator period (e.g. $\frac{1}{100}$). For this reason the switches included in said converter and controlled by input 11, must be of the electronic type, realized e.g. by means of transistors. The reasons of this choice, and the limitation upon which the choice of the frequency for the oscillator 12 depends will be explained later on in the description.

Therefore on the output terminal 13 of the position measuring transformer T a signal is obtained having also a 10 kHz. frequency and a maximum amplitude proportional to the difference between the present position of the movable part 2 along axis X and the position represented by the digital information contained at present in the internal counter 10, with a phase shift of either 90° or 270° with respect to the oscillator signal, according as to whether the sign of said difference is positive or negative (FIGS. 3a and 3b). Based on the above mentioned assumptions, it is understood that the present position is referred to each polar pitch and that said number represents a position within the extent of one polar pitch.

The analog error signal applied on output terminal 13 of the position measuring transformer T, via a suitable amplifier 14, is transferred to the input terminal 15 of a control unit 16 suited to control the counting operation of internal counter 10, in order to modify the digital information contained therein so as to substantially reduce to zero said analog error signal. It is understood that the error signal will be reduced to zero when said digital information corresponds to the present position of the movable part 2.

Figure 2:
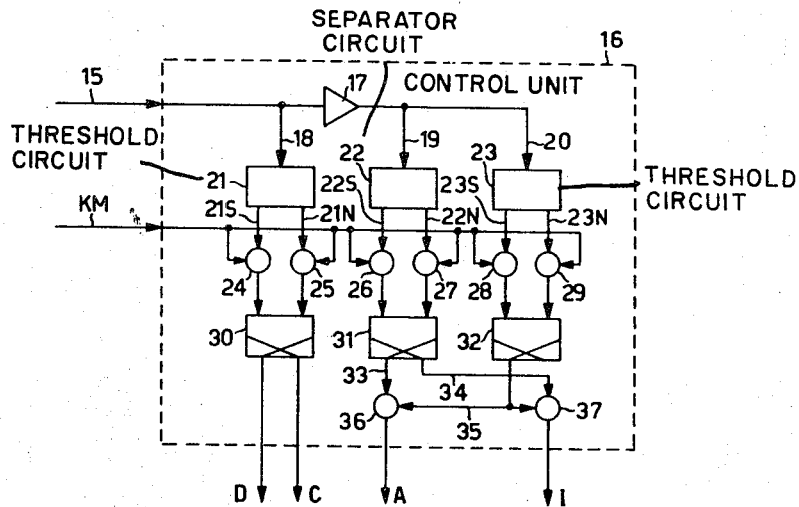
FIG. 2 shows a scheme of the control unit used in the converter illustrated in FIG. 1.

With reference to FIG. 2 a particular embodiment of the control unit 16 and its mode of operation will now be described.

The control unit 16 receives on its input terminal 15 the analog error signal and performs on it three kinds of control functions: it determines whether said error is present or not; it controls the sign of said error; finally it discriminates the magnitude of said error, by determining, in the particular embodiment being described, whether it represents a displacement corresponding to hundredths or to tenths of the polar pitch of the position measuring transformer T.

The analog error signal present on input terminal 15, via a proper amplifier 17, is applied to the input terminal 20 of threshold circuit 23, known per se, which determines the error sensitivity level 45 (FIG. 3a) for the digital position measuring device MP, whereby said threshold circuit is adapted to energize either the output terminal 23S, or the output termnal 23N, according as to whether the maximum amplitude of the sinusoidal voltage representing said error signal applied on input 20 is higher or lower than the voltage level 45 of said threshold circuit 23. The output signals 23S and 23N, via gates 28 and 29, respectively, both controlled by the switch timing signal KM (whose function wil be explained later on) are applied to energize and to deenergize, respectively, the bistable element 32 having the function of memorizing, throughout each period of the oscillator 12, whether said error has been present or not. The presence of an error signal higher than threshold 45 is revealed by the energization of output 35 of said bistable element 32.

The output of amplifier 17 also feeds the input 19 of a separator circuit 22, known per se, suited to supply on output terminals 22S and 22N the respective positive and negative half-waves, the negative half-waves of the sinusoidal voltage representing said error signal. Said outputs 22S and 22N, via gates 26 and 27 respectively, which are both controlled by the switch timing signal KM, are supplied respectively to energize and to deenergize a bistable element 31 whose function is to memorize, throughout each period of the oscillator 12, whether the error voltage was positive or negative. The presence of a positive or negative error signal is revealed by the activation of outputs 33 or 34, respectively, of said bistable element 31.

Said outputs 33 and 34 control the "and" circuits 36 and 37, respectively, whilst output 35 of bistable element 32 controls both said "and" circuits 36 and 37. Therefore, if threshold circuit 23 reveals the presence of an error and thus output 35 of bistable element 32 is correspondingly energized, either the output terminal A of "and" circuit 36, or the output terminal I of "and" circuit 37 will be energized, depending as to whether the output terminal 33 or output terminal 34 of bistable element 31 has been energized, in other words according as to whether the error signal bears a positive or a negative sign. Furthermore, according to what has been previously explained, it clearly results that if no error is revealed by threshold circuit 23, whereby output 35 of bistable element 32 is duly deenergized, neither of outputs A and I appears to be energized.

Finally the analog error signal is directly transmitted from input terminal 15 of the control unit to the input terminal 18 of a threshold circuit 21, known per se, suited to energize either its output 21S or 21N, according as to whether the magnitude of said error signal is higher or lower than a predetermined threshold level 52 (FIG. 3b). More particularly, said threshold level can be chosen to be equal to the maximum amplitude of the sinusoidal error signal which corresponds to $\frac{1}{20}$ of the polar pitch of the position measuring transformer T, namely 0.1 mm. according to the example we are referring to; therefore the threshold circuit 21 serves the purpose of discriminating the errors corresponding to tenths of the polar pitch from the errors corresponding to the hundredths of said polar pitch by energizing either the output terminal 21S or 21N respectively. Said outputs 21S, 21N, via gates 24, 25 respectively, controlled by the switch timing signal KM, are fed to energize, to deenergize respectively, a bistable element 30 serving the purpose of memorizing throughout each period of the oscillator 12, whether the amplitude of the error was corresponding to the tenths or to hundredths of said polar pitch and thus energizes either output D or C, respectively.

The switch timing signal KM is composed of a series of pulses obtained from the sinusoidal waveform of oscillator 12. This feeds, besides the digital-to-analog converter 9, a squaring circuit 38 (FIG. 1) which controls a pulse generating circuit 39 having two outputs KM and KC. Said circuit 39 is suited to generate on output KM a series of pulses (FIGS. 3a and 3b) occurring respectively at the points where the square wave supplied by square wave generator 38 crosses the zero line in descending direction; furthermore the same circuit 39 is apt to generate on output KC a series of pulses (FIGS. 3a and 3b) occurring respectively at the points when the same waveform supplied on the output of the squaring circuit crosses the zero line ascending direction.

As already stated, the pulses KM control gates 24, 25, 26, 27, 28 and 29. More particularly, for each period of the wave form generated by oscillator 12, a strobe pulse KM is generated, said pulse KM establishing the instant in which the bistable elements 30, 31 and 32 may change their state, said change being such as to either energize or deenergize said bistable elements according as to whether within each pair of gates 24 and 25, 26 and 27, 28 and 29, the first or second gate is opened.

FIGS. 3a and 3b show the different waveshapes appearing on the output of oscillator 12, position measuring transformer T, squaring circuit 38, pulse generator 39, separator 22 and control unit 16, with their respective timing. More particularly, FIGS. 3a and 3b refer to the case of an error signal 13 which is initially phase shifted 90° with respect to the signal of the oscillator 12 (that is, according to the assumption previously made, FIGS. 3a and 3b refer to an error signal which is initially positive). Therefore the strobing pulses KM are initially in phase with the positive half-waves of said error signal, which energizes the output 22S of the separator 22, whereby via gate 26 the bistable element 31 is energized.

In the case opposite to the one shown in FIG. 3, i.e. if error signal 13 had a negative sign, the strobing pulses KM would appear in phase with the negative half-waves of said error signal, which energize output 22N of separator 22, whereby via gate 27 bistable element 31 would be deenergized.

Outputs A and I of control unit 16, selectively supplied in the manner previously explained, are fed to allow the respective forward, and backward counting of the internal counter 10. The latter is a reversible counter known per se and comprises a plurality of decades, each one composed of a binary counter, for instance two decades 10C and 10D, respectively representing the hundredths and the tenths, according to the embodiment illustrated in FIG. 1. Moreover, said decades are so interconnected that decade 10D counts the counting cycles of decade 10C, in other words, decade 10D is fed with a counting pulse from the preceding decade 10C, after the latter has received ten pulses, which have caused it to execute a complete counting cycle.

Outputs D and C of control unit 16, selectively energized as previously explained, represent two channels that control the opening of gates 40 and 41 respectively, which control decades 10D, and 10C respectively, of the internal counter.

The counting pulses generated on the output KC of circuit 39 are applied to both gates 40 and 41 and, through these gates and via conductors 43, 44 respectively, they are sent to selectively control the counting operation of either section 10D or 10C respectively, according as to whether control unit 16, via channel D or C, has energized gate 40 or 41, respectively. Therefore, for each period of the waveform generated by oscillator 12, circuit 39 supplies a pulse KC which controls the counting operation of one of the decades of internal counter 10, according to the results of the control operations accomplished on the error signal by control unit 16 at the instant defined by the switch timing pulse KM pertaining to the same period. In order that a pulse KC fed to internal counter 10 may be effective to cause it to count, it is essential that one of the two gates of control unit 16 be open so as to condition said counter for forward or backward counting.

Each effective pulse KC produces a change of the digital contents of counter 10 and, consequently, a change of the analog signals on outputs 7 and 8 of digital-to-analog converter 9; said signals now represent the respective functions sine and, cosine of the new digital number present in said counter. In this way a new analog error signal will also appear on output 13 of the position measuring transformer T; the new signal will still be a sinusoidal voltage having a frequency of 10 kHz., a maximum amplitude which is proportional to the difference between the present position of movable part 2 along its displacement axis X, and the position represented by the new digital number present in counter 10, and a phase displacement of either 90° or 270°, with respect to the signal of oscillator 12 according to the polarity of said difference.

Said new error signal through amplifier 14 is applied to the input of control unit 16 which analyzes said signal in order to establish its amplitude and its polarity and in order to energize, among outputs A, I, D, C, the pair of outputs characterizing the new situation, so that it controls the counting operation of counter 10 in the sense and in the decade suited to progressively reduce to zero the value of said error. These internal operations go on in the aforesaid way looking to lead the system to a balance condition. Particularly, when part 2 is stopped, the balance condition is reached for an error signal whose level is lower than the threshold level 45 (corresponding to the system sensibility); whereby neither output A nor output I will be energized and thus counter 10, being no longer conditioned for counting operations, will remain in the condition thus reached for all the time said part 2 stands stationary. In this case the digital information supplied by said counter corresponds to the effective present position of part 2 in respect of part 1 within a polar pitch, except for an error corresponding to threshold level 45 of the sensitivity. In the inverse case, in which movable part 2 is in motion, the internal reactions of the system, as prior explained, must allow counter 10 to contain a digital information which constantly keeps pace with the effective position of movable part 2; this result is obtained only if the switching time of the elements forming the system is negligible with respect to the period of oscillator 12.

From the preceding explanations, it is clear that control unit 16 discriminates the error signal according to its polarity; furthermore it selects channels D or C, suited to control the counting operation in two different decades of counter 10, according to whether the magnitude of said error signal is higher or lower than threshold level 52; in the case we are considering, said threshold level is equal to the magnitude of the error representing $\frac{1}{20}$ of said polar pitch, i.e. 0.1 mm. More generally, the internal counter can include a number $n$ decades (or of other denominations in case a system other than binary-decimal is used) interconnected in such a way that each decide counts the counting cycles accomplished by the preceding decade; each decade can be selectively controlled, either by said preceding decade or by a corresponding different channel selected by said control unit according to said error signal. In this case the control unit will include $n-1$ circuits such as circuit 21, each one with a different threshold level which represents a different amplitude band of the error signal; said $n-1$ circuits must be connected together in such a way that said control unit is adapt to discriminate $n$ different channels corresponding to $n$ different magnitude bands of said error signal. If, for instance, the counter includes three decades apt to count respectively the tenths, the hundredths and the thousandths of a millimeter, the control unit must be equipped with two circuits identical to circuit 21 and having a threshold level equal to the amplitude of the error respectively representing $\frac{1}{200}$ and $\frac{1}{20}$ of the polar pitch of said position measuring transformer to which reference is made, and arranged in such a way as to obtain three channels suited to control said three decades of the counter. Said three channels are activated, respectively, by an error signal lower than the level of said first lower threshold, falling within the levels of said two thresholds, and higher than the level of said second (upper) threshold.

FIG. 1 also shows external counter 42 which may be composed of any number of decades, e.g. of four decades 42C, 42D, 42U, 42E, identical to the ones of internal counter 10, and interconnected in such a way as to obtain a reversible counter. The two first decades 42C and 42D correspond to the identical sections 10C and 10D of internal counter 10; therefore they are selectively controlled by the same channels 44 and, respectively, 43.

Decades 42C, 42D, 42U and 42E are interconnected in chain form so that each decade counts the counting cycles accomplished by the preceding decade; sections 42U and 42E are controlled only by the decade that precedes, section 42D can be selectively controlled either by preceding section 42C, or by channel 43, section 42C is controlled only by channel 44.

The counting sense of said external counter 42 is controlled, in the identical manner as described for internal counter 10, by means of channels A and I. While decades 42C and 42D respectively count, in the same way as sections 10C and 10D of internal counter 10, the hundredths and the tenths of millimeter, sections 42U and 42E respectively count the units and the tens of millimeters comprised in the effective displacement of movable part 2.

Said external counter 42 is furthermore provided with means for resetting to zero or for modifying its digital contents, and, moreover, for controlling the counting sign inversion at the instant the counting operation crosses the zero value. As it will be further explained, all these operations can be carried out independently from internal counter 10.

We will now describe the operation of the digital position measuring device MP during its employment. We assume that movable element B is represented by a carriage equipped with a reference index and able to slide on guide rails along a direction X, and driven by hand or by other means. Furthermore, we assume that movable member 2 is rigidly attached to carriage B and that independent input 6 is fed with an analog magnitude directly representing the present position of the carriage. Moreover, assumption is made that the digital position measuring device MP is used to measure the dimensions of a workpiece machined along said direction X. As its first operation the carriage index must be placed on one extremity of the segment to be measured in the workpiece: by acting on the reset means, the digital contents of external counter 42 is cancelled, while internal counter 10, according to its own way of operation, supplies the indication of the present position of movable part 2 with respect to fixed part 1, relative to the extent of one polar pitch.

Successively carriage B is displaced as far as to bring the index in coincidence with the other extremity to be measured on the workpiece: in this condition external counter 42 shows the absolute digital value and the sign of the dimension being measured, while internal counter 10 shows the digital indication of the new position reached by movable part 2 with respect to fixed member 1, always with reference to the extent of one polar pitch.

Generally, carriage B can slide with different speeds. With reference to FIGS. 3a and 3b, we will consider the operation of a digital position measuring device working with displacement speeds which are constant and of different values. FIG. 3a shows the time diagram of the error signal applied on output 13 of position measuring transformer T concerning a slow displacement speed. Voltage level 45 represents the level of threshold circuit 23 (except for the amplification produced by amplifier 17) i.e., in other words, the minimum error voltage to which control unit 16 is sensitive. Signal 46 is a sinusoidal voltage having a frequency identical to the frequency of oscillator 12 (10 kHz.) and lagging 90° (for a positive error) and having an amplitude modulated by the displacement of movable member 2 effected at slow and constant displacement speed; said displacement causes a sinusoidal change of the error amplitude in the extent of each polar pitch. Therefore the error signal may be represented, by a time diagram, as a function having the following form:

$$H \cdot \sin 2\pi \frac{Vt}{p} \cdot \sin 2\pi \, ft.$$

in which H is a proportionality constant depending upon the amplification ratio between the output of oscillator 12 and output 13 of position measuring transformer T, V is the displacement speed of movable part 2, and p is the polar pitch.

If we assume operation at low speed, e.g., in the case considered, with a speed $V < pf./200$, for a time interval corresponding to some oscillator periods, the waveform of the error signal may be represented, with a good approximation, by function $$H \cdot 2\pi \frac{Vt}{p} \cdot \sin 2\pi \, ft.$$

In FIG. 3a, diagram 47 represents the modulating function $$H \cdot 2\pi \frac{V}{p} \cdot t$$

generated by the sliding of movable part 2, i.e. the time diagram we would obtain for the error signal should the digital-to-analog converter 9 be fed with a continuous signal rather than with a sinusoidal signal.

It is understood that, according to the hypothesis previously made, the digital contents of counter 10 must correspond, in each instant, to the position of movable part 2 with respect to fixed part 1, within the extent of one polar pitch; said position is expressed in tenths and hundredths of millimeter by the digits appearing in the setcions 10D and 10C, respectively. Said digital indication is exact except for the system sensitivity, which, in the case we are considering, is equal to $\frac{1}{200}$ of polar pitch, i.e. equal to 10 $\mu$m.

When sliding the carriage B with a constant slow speed V1 (in our case less than 100 mm./sec.) along the proper moving direction X, e.g. in the positive sense, the analog error signal appearing on output 13 changes according to diagram 46. When the sinusoidal magnitude exceeds the value of threshold level 45, circuit 39 produces a switch timing pulse KM in time coincidence with the first positive peak P, and the control unit can correctly activate the outputs A and C.

Successively, a half period later, in time coincidence with the point Z, circuit 39 produces a counting pulse KC which, via gate 41 being kept open by channel C, causes the hundredths decades 10C and 42C to count one-step forward.

The modification of the digital contents of internal counter 10 produces, via transfer channel 11, a change of the analog signals on outputs 7 and 8 of the digital-to-analog converter and, consequently, a change in the amplitude of the error signal on output 13 of the position measuring transformer T. The hypothesis previously made for converter 9, i.e. that its set-up time is short with respect to the period of the oscillator 12, allows the variation of the amplitude of the error signal to be considered as instantaneous. Furthermore, assuming, according to FIG. 3a, that, the change of the digital contents of counter 10 occurring upon counter 10 counting one step forward is such as to determine a sign inversion of said error signal and an amplitude reduction down to a value lower than threshold level 45, then a phase inversion will be produced in the diagram 46 at the instant Z. Thereafter the modulating function will begin again to increase starting from a lower level, as shown in the diagram 48. Diagram 48 is similar to diagram 47 and is displaced with respect thereto an amount OS representing the time required for movable part 2 to be displaced at the speed V1 a distance equal to $\frac{1}{200}$ of the polar pitch i.e. equal to $\frac{1}{100}$ mm. As carriage B continues sliding in the positive sense with constant speed V1, the operation continues in the way previously described, it being understood that upon movable part 2 being displaced 1 hundredth of a polar pitch, decade 10C of the counter is led one step forward, while upon movable part 2 being displaced $\frac{10}{100}$ of a millimeter, decade 10C causes decade 10D to progress one step forward.

In the conditions assumed up to now, the displacement speed of movable part 2 is so slow that counter 10, always controlled by counting pulses KC applied via channel 44, is able to keep pace, i.e. to adapt its digital contents to the true position of said movable part.

If, on the other hand, the displacement speed of carriage B is high enough (in the case we are considering pf./200<V<pf./20), the system conditions change and may be exemplified as shown in FIG. 3b in which the error signal, appearing on output 13 of position measuring transformer T, can still be expressed by function $$H \cdot 2\pi \frac{V}{p} t \sin 2\pi ft.$$

for a time interval which is shorter than two oscillator periods, as illustrated by diagram 49; diagram 50 represents the modulating function $$H \cdot 2\pi \frac{Vt}{p}$$

produced by the displacement of movable part 2, i.e. the time diagram that would appear if digital-to-analog converter 9 were fed with a continuous signal rather than with a sinusoidal signal. Voltage level 52 represents the threshold level of circuit 21, i.e. the error voltage above which the control unit selects channel D.

Thus, by sliding carriage B with a constant and high speed V2 (e.g. 0.9 m./sec.) along proper displacement direction X, e.g. in the positive sense, the analog error signal, appearing on output 13, changes according to diagram 49. When the sinusoidal magnitude exceeds threshold level 52, circuit 39 produces a swtich timing pulse KM in correspondance to first positive peak Q and the control unit can then correctly energize channels A and D. Successively, a half period later, in correspondance to instant R, circuit 39 produces a counting pulse KC which, via gate 40 kept open by channel D, controls the one step forward counting of tenths decades 10D and 42D.

The change of digital contents of internal counter 10 controls, via transfer channel 11, a change of the analog signals appearing on outputs 7 and 8 of the digital-to-analog converter and, consequently, an instantaneous amplitude change of the error signal appearing on output 13 of position measuring transformer, in the same manner as explained for the slow displacement. Assuming, according to FIG. 3b, that said one-step forward change of the digital contents of counter 10 is such as to reduce the magnitude of said error to a value lower than threshold level 52, the modulating function will begin to increase at the instant R, starting from a lower level, as represented by diagram 51, which is similar to diagram 50 except for a translation, with respect to the latter, by a quantity depending upon the residual error at the switching instant R.

As carriage B continues to be displaced in the positive sense at a constant speed V2, the operation continues in the described manner, it being understood that, any time movable part 2 is being displaced 1 tenth of a millimeter, section 10D of the counter D is caused to count one step forward under the control of the counting pulses KC applied by channel D on line 43.

With the above assumption the counting speed of counter 10 is high enough to allow it to keep pace, i.e. its digital contents can follow the true position of said movable part.

From the above description, it clearly appears that two different amplitudes of the error signal correspond to the two different displacement speeds V1 and V2 of the movable part, respectively, whereby control unit 16 automatically selects two different channels (either C or D) to control the counting operation of counter 10.

It is thus apparent that said internal counter 10 can selectively operate at two different counting speeds corresponding to the two different speeds at which independent input 6 can be fed. Said two different counting speeds are obtained, in a known manner, by selectively applying counting pulses KC to a different decade of the internal counter via a corresponding channel.

The maximum allowed speed for the displacement of movable part 2 is pf./20 (which corresponds to a speed of 1 m./sec., in the embodiment described) i.e. that speed at which the switchings of the modulating function of the error signal have the same frequency as the oscillator, so that the counter is still able to keep pace for its counting operation. Of course it is possible to establish a suitable limit to said speed, e.g. by means of a brake coming into action at the allowed maximum speed.

A higher speed is obtainable just by raising the frequency f of the oscillator, or by increasing the pitch p of the position measuring transformer. For these reasons the frequency of the oscillator has to be chosen in relation to the pitch of position measuring transformer T and to the maximum displacement speed permitted. Anyway, the increase in frequency f has a limit determined by the switching time of the elements composing the system.

The conditions previously made for internal counter 10 can be applied to the external counter 42 as decades 42C and 42D correspond respectively exactly to decades 10C and 10D, while decades 42C and 42E, which represent the coarse section of counter 42, count under the control of the fine section represented by decades 42C and 42D. Furthermore, an external counter 42 is provided with means operable to produce (manually for instance) resetting or shifting operations and with means for automatically changing the sense of the count when counting crosses zero, said counter can operate either as an absolute or as an incremental counter. Therefore, in the position measuring device according to the invention the following operations are possible: shifting of the reference point; inversion of the positive sense of an axis; counting always in direct form, with no need of recomplementing the contents of the external counter.

The presence of external counter 42 allows the position measuring device MP to be set in any preceding position with sufficient accuracy and without waste of time, even after a long time or after faults in the power supply, i.e. in the cases in which the digital contents of said external counter are destroyed. In fact, assuming that the fixed part of the position measuring transformer is provided with an absolute reference point, which represents the absolute zero of the equipment, and assuming, furthermore, that it is possible to detect by proper means, the alignment of the movable part with respect to said absolute reference point, it is possible to repeat the positioning of the movable part on a predetermined point, spaced a known distance from the absolute reference point, by acting according to the following procedure. Initially the index of the movable part is brought into coincidence with the absolute reference point and the external counter is reset; thereafter, the movable part is displaced in the sense indicated by the sign of the position to be reached, as long as the external counter shows a digital indication corresponding to said known distance. On the other hand, if the position of said predetermined point is given by means of its distance referred to a relative origin, whose coordinates with respect to the absolute reference point are known, then the previously described operations must first be repeated so as to position the movable part on said relative origin, and, upon reaching such position, the external counter is again reset; thereafter the movable member is displaced, in the sense indicated by the sign of the position to be reached, as long as said counter supplies a digital indication corresponding to said known relative distance.

The accuracy of indication of the position of the movable part of the position measuring device according to the invention can be improved, in a known way, by measuring in an analog form by proper means the residual error, if any still present on channel 15 when the system is in its balance condition, said error having a value lower than the system sensitivity level.

It is to be noted that for good operation of the position measuring device MP to be obtained, some precautions are required to make sure that the sign inversion of the counters 10 or 42 duly occurs. More particularly the tenths channel D must be kept deenergized when the error signal is near zero, and simultaneously the hundredths channel D must be kept energized in order to allow sections 10C and 42C to count backwards, down to zero, before the sign inversion occurs in the counter.

Contrary to the other known devices, the described digital position measuring device is simplified because it requires only one servo-system which is selectively sensitive to two different operation speeds; furthermore for the detection at both coarse and fine error signal, only one position measuring transformer is used, and only one digital-to-analog converter is required to feed said counter. Finally, the presence of a sensitivity threshold 45 prevents the system from becoming unstable when part 2 stands stationary i.e. it prevents counters 10 and 42 from oscillating, and counter 42 from alternatively displaying two points contiguous to the true position of movable part 2. In order to eliminate in a correct way this instability affecting the last digit indicated by sections 10C and 42C of the two counters, it is sufficient to establish the threshold 45 to a value comprised between 0.5 and 1 times the voltage corresponding to an error equal to one unit of said last digit (in the present embodiment the threshold must be comprised between the voltage values corresponding to an error of 5 and 10 $\mu$m. respectively).

It is understood that many changes, addition of parts and improvements may be made to the above described device without departing from the scope thereof.

What is claimed is:

1. In a digital position measuring device for measuring the displacement of a movable member with respect to a fixed member,
   (a) a counter having a digital contents and comprising a plurality of stages interconnected in a counting chain,
   (b) a digital-to-analog converter fed by said counter for converting said contents into an analog signal,
   (c) a position transducer able to continuously compare said analog signal with an analog magnitude representing the continuously varying position of the movable member to supply an error signal, whose amplitude depends upon the displacement speed of said movable member,
   (d) means for generating a series of counting pulses at a predetermined frequency,
   (e) a plurality of channels fed by said pulse generating means, each channel feeding a different stage of said plurality of stages,
   (f) and a control unit fed by said position transducer with said error signal to select one of said plurality of channels according to the amplitude of said error signal for applying counting pulses to the correspondent stage of said counter, so that this last named is controlled to selectively operate a different counting stage in accordance with the displacement speed of the movable member.

2. In a digital position measuring device for measuring the displacement of a movable member with respect to a fixed member,
   (a) a counter having a digital contents and comprising a plurality of stages interconnected in a counting chain,
   (b) a digital-to-analog converter fed by said counter for converting said contents into an analog signal,
   (c) a position transducer able to continuously compare said analog signal with an analog magnitude representing the continuously varying position of the movable member to supply an error signal, whose amplitude depends upon the displacement speed of said movable member,
   (d) means for generating a series of counting pulses at a predetermined frequency,
   (e) a plurality of channels supplied by said pulse generating means, each channel feeding pulses to a different stage of said plurality of stages through a gate which is normally closed and being allotted to a different amplitude range of said error signal,
   (f) and an amplitude discriminator fed by said position transducer with said error signal to energize selectively an output one of a plurality of output lines, each one corresponding to one of said different bands of said error signal and controlling the opening of the gate of the relevant channel.

3. In a digital position measuring device for measuring the displacement of a movable member with respect to a fixed member,
   (a) a counter having a digital contents and comprising a plurality of stages interconnected in a counting chain,
   (b) a digital-to-analog converter fed by said counter for converting said contents into an analog signal,
   (c) a position transducer able to continuously compare said analog signal wtih an analog magnitude representing the continuously varying position of the movable member to supply an error signal, whose amplitude depends upon the displacement speed of said movable member,
   (d) timing means for defining a series of equal periods,
   (e) a plurality of channels, each of which corresponds to a different range of the amplitude of said error signal and feeds counting pulses to a different stage of said plurality of stages through a gate which is normally closed,
   (f) a control unit fed by said position transducer with said error signal to open selectively one of said gates according to the amplitude of said error signal,
   (g) means controlled by said timing means for defining a first and a second series of pulses fed on a first and second outlets respectively, the pulses of the second series being delayed with respect to the ones of the first series,
   (h) said first outlet being linked to said control unit so that each pulse of said first series is able to energize said control unit which according to the amplitude of said error signal selects and opens one of said gates,
   (i) and said second outlet being linked to the different channels of said plurality through the relevant gates so that the pulses of said second series are routed and accumulated in the stage corresponding to the opened gate via the relevant channel, to increment said digital contents till said error signal is substantially reduced to zero.

4. In a digital position measuring device for measuring the displacement of a movable member with respect to a fixed member along an axis comprising a plurality of regularly distributed zero positions,
   (a) a first bidirectional decade counter having a first digital contents, whose maximum capacity corresponds to the digital representation of the distance between two contiguous zero positions, (b) a second bidirectional decade counter similar to said first counter but having a second digital contents, whose maximum capacity is greater than said first counter, (c) a digital-to-analog converter fed by said first counter for converting said first contents into an analog signal, (d) a position measuring transformer able to continuously compare said analog signal with an analog magnitude representing the continuously varying position of the movable member to supply an error signal, whose amplitude depends upon the displacement speed of said movable member, (e) said position measuring transformer having at least one fixed winding placed on said fixed member and fed by said analog signal, and one movable winding placed on said movable member and able to supply said error signal, said windings having a plurality of poles with a constant polar pitch and said first digital contents representing the position of the movable winding within each polar pitch with respect to said fixed winding, (f) timing means for defining a series of equal periods, (g) first means controlled by said timing means and operable for modifying said first and second contents a first predetermined amount during each one of said periods, (h) second means controlled by said timing means and operable for modifying said first and second contents a second predetermined amount during each one of said periods, (i) a control unit fed by said error signal for operating either said first or second means for conferring a sign to said first or second amount depending upon the amplitude and the sign of said error signal, (j) said second counter being equipped with means for presetting said second contents to a preliminarily chosen value, so that said second counter is able to function as an absolute counter and as a totalizer of the polar pitches travelled by said movable member.

References Cited
UNITED STATES PATENTS

| | | | |
|---|---|---|---|
| 3,183,421 | 5/1965 | Herchenroeder | 318—28 |
| 3,234,544 | 2/1966 | Marenholtz | 340—347 |
| 3,239,736 | 3/1966 | Gardberg | 318—28 |
| 3,261,012 | 7/1966 | Bentley | 340—347 |

MAYNARD R. WILBUR, Primary Examiner

M. K. WOLENSKY, Assistant Examiner

U.S. Cl. X.R.

235—92; 318—28